Aug. 4, 1925.
P. J. DIXON ET AL
1,548,414
ELECTRIC LIGHTED LICENSE PLATE FOR AUTOMOBILES
Filed Nov. 18, 1922
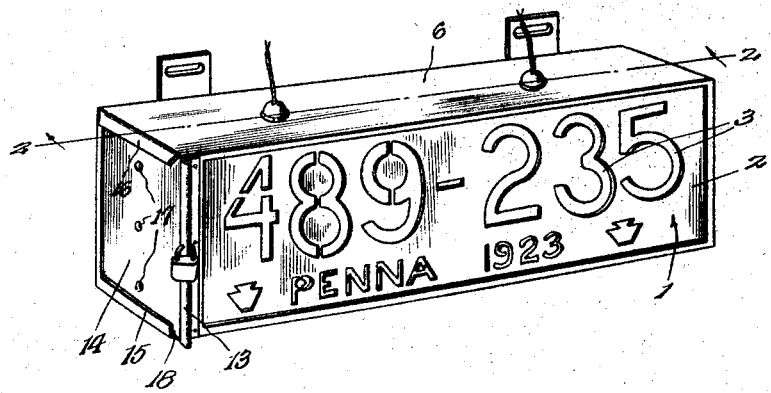
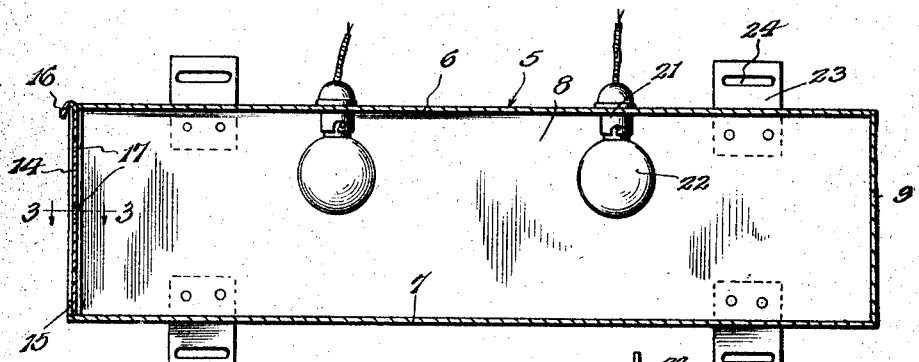
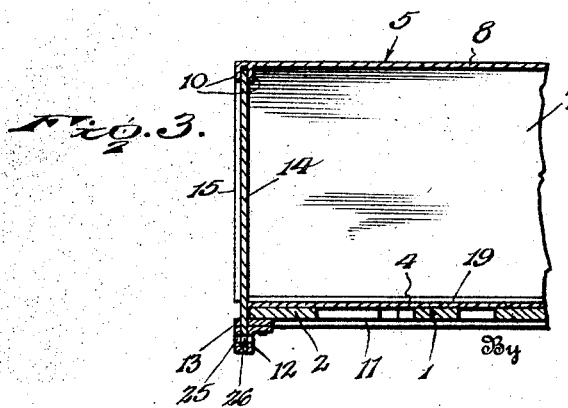
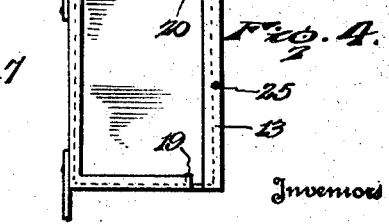
Inventors
Patrick J. Dixon.
Carl A. Kelly.
George W. Thomas.

Patented Aug. 4, 1925.

1,548,414

UNITED STATES PATENT OFFICE.

PATRICK J. DIXON, CARL A. KELLY, AND GEORGE W. THOMAS, OF SCRANTON, PENNSYLVANIA.

ELECTRIC-LIGHTED LICENSE PLATE FOR AUTOMOBILES.

Application filed November 18, 1922. Serial No. 601,944.

*To all whom it may concern:*

Be it known that we, PATRICK J. DIXON, CARL A. KELLY, and GEORGE W. THOMAS, citizens of the United States, residing at Scranton, in the county of Lackawanna and State of Pennsylvania, have invented certain new and useful Improvements in Electric-Lighted License Plates for Automobiles, of which the following is a specification.

This invention relates to improvements in illuminated automobile license plates and has as one of its objects to provide a novel form of plate and holder therefor both of which may be manufactured at a low cost and readily installed upon an automobile.

Another object of the invention is to provide a license plate and holder therefor so constructed as to display to the best advantage the license numbers, and other data required by law to be displayed as a means for identifying the licensed machine.

Another object of the invention is to so construct the holder for the license plate that it may be used from year to year, the holder embodying means whereby one license plate may be removed and another readily substituted therefor, the plate, when introduced into the holder being firmly supported so as to provide against its dislodgment.

Another object of the invention is to provide a holder so constructed that license plates complying with the laws of various States may be supported within the holder.

In the accompanying drawings:

Figure 1 is a perspective view of the license plate and holder embodying the invention;

Figure 2 is a vertical longitudinal sectional view taken substantially on the line 2—2 of Figure 1 looking in the direction indicated by the arrows;

Figure 3 is a detail horizontal sectional view taken substantially on the line 3—3 of Figure 2;

Figure 4 is a view in end elevation of the holder or casing for the plate, the closure for this end, and likewise the plate, being omitted for the sake of clearness.

The license plate is indicated in general by the numeral 1 and the said plate comprises a sheet 2 of relatively heavy material which is preferably opaque and in which are cut numerals and letters, indicated by the numeral 3, to form the license number, the State name, the license year, and any other data which it may be desired to display. The sheet 2 is provided with a backing 4 which is preferably of celluloid and this backing is disposed against the rear face of the sheet 2 and may, if desired, be secured to the said sheet 2 in any suitable manner. The backing sheet 4 will be of one color or another depending upon the laws or regulations of the State in which the license plate is to be used and it will be evident that if a different color is employed in successive years, a backing sheet of the appropriate color may be employed each year for the tag or plate issued for that year. It will also be evident that inasmuch as the backing sheet is of celluloid or similar light ray transmitting material, whether transparent or translucent, the license data will be distinctly displayed at night and will be equally distinct during daylight hours, the sheet 2 and the backing sheet 4 being of course of contrasting colors.

The holder for the license plate is in the form of a casing which is indicated in general by the numeral 5 and which may be conveniently formed from sheet metal. The casing comprises a top 6, a bottom 7, a rear wall 8, and an end wall 9, the casing at its opposite end being closed by a sliding removable door, and at its front being closed by the license plate 1. At that end at which the sliding door, above referred to, is located, the casing is provided along the vertical edge of its rear wall 6 with spaced flanges 10, or the said wall may be grooved, and there is secured to one end of a frame 11 which defines the open front of the casing within which the license plate 1 is positioned, a guide member 12 having spaced flange portions 13 which oppose the flanges 10. The sliding door referred to above is indicated by the numeral 14 and the same is slidably received at its vertical edges within the grooves defined by the flanges 10 and 13. The bottom 7 of the casing may be provided at this end thereof with an upstanding flange 15 behind which the lower edge of the door 14 may seat when the door is in lowered or closed position. In order that the door may be slid into and out of position within the end of the casing from the top, it is preferably provided at its upper edge with an overturned flange 16 constituting a hand hold which may be grasped for the purpose stated. Ventilating openings 17 are preferably provided in the door 14.

At the front corner of the bottom of the casing, the flange 15 is cut away as indicated by the numeral 18, and a flange 19 is provided upon the upper side of the bottom 7 of the casing and extends longitudinally of the said bottom and parallel to the lower side of the frame 11. A similar flange 20 depends from the under side of the top 6 of the casing, and these two flanges, in conjunction with the upper and lower sides of the frame 11, constitute guides for the upper and lower edges of the license plate 1 thereby adapting the said plate to be slid into place in the open front of the casing through the notch 18 and until the said plate has assumed a position closing the front of the casing and seating behind the frame 11. The door 14 may be slid into place after the license plate has been slid into position, and by reference to Figures 1 and 3 of the drawings it will be observed that when the door is in place the license plate will be securely retained against displacement.

Electric light sockets 21 are mounted in the top 6 of the casing and accommodate the bases of bulbs 22 which constitute the source of illumination for the license plate 1. It will be evident at this point that not only does the door 14 constitute a means for preventing longitudinal displacement of the license plate after it has been properly arranged within the front of the casing, but likewise by removing the door, access may be had to the interior of the casing for the purpose of removing and replacing the bulbs 22.

In order that the casing may be mounted upon the brackets which are ordinarily present on an automobile for the attachment of the ordinary license plate, bracket ears 23 are riveted or otherwise secured to the rear wall 8 of the casing at the top and bottom thereof and are provided with slots 24 for the passage of straps, bolts, or other fastening devices.

Preferably the flanges 12 and 13 will be formed with alined openings 25 and the removable end 14 of the casing will be formed with a similar opening 26 designed for registration with the openings 25 so as to accommodate the bail of a padlock 27.

It is also preferable that the inner surfaces of the walls of the casing be finished with white enamel so that the rays from the light bulbs 22 will be intensified.

Having thus described the invention, what is claimed as new is:

1. A license display device comprising a casing including a top, a bottom, a closed back, a closed end wall, and an open front, a light ray transmitting license plate in the front of the casing, the other end of the casing being open, the license plate being slidably removable from the casing through the said open end thereof, spaced flanges at the rear wall of the casing at the said open end thereof, an upstanding flange upon the bottom of the casing at said open end of the casing, a channel member upon the front wall of the casing at the open end of the casing, and a removable closure for the said open end of the casing slidably removably fitted in the said flanges upon the rear wall of the casing and behind the flange at the bottom of the casing and likewise fitting in the channel member at the front of the casing and constituting means for retaining the license plate against withdrawal from the casing.

2. A license display device comprising a casing including a top, a bottom, a closed back, a closed end wall, and an open front, a light ray transmitting license plate in the front of the casing, the other end of the casing being open, the license plate being slidably removable from the casing through the said open end thereof, spaced flanges at the rear wall of the casing at the said open end thereof, an upstanding flange upon the bottom of the casing at said open end of the casing, a channel member upon the front wall of the casing at the open end of the casing, a removable closure for the said open end of the casing slidably removably fitted in the said flanges upon the rear wall of the casing and behind the flange at the bottom of the casing and likewise fitting in the channel member at the front of the casing and constituting means for retaining the license plate against withdrawal from the casing, the side walls of the channel member at the front of the casing being provided with openings as also the forward edge portion of the said closure, and a locking member having a bail engaged through said openings.

In testimony whereof we affix our signatures.

PATRICK J. DIXON.
CARL A. KELLY.
GEORGE W. THOMAS.